Aug. 14, 1934.  J. C. WHITESELL, JR  1,970,347
METHOD AND APPARATUS FOR SHAPING SHEET MATERIAL
Filed June 9, 1930  2 Sheets-Sheet 1

INVENTOR.
John C. Whitesell Jr
BY
John P. Tarbox
ATTORNEY.

Aug. 14, 1934.  J. C. WHITESELL, JR  1,970,347
METHOD AND APPARATUS FOR SHAPING SHEET MATERIAL
Filed June 9, 1930  2 Sheets-Sheet 2
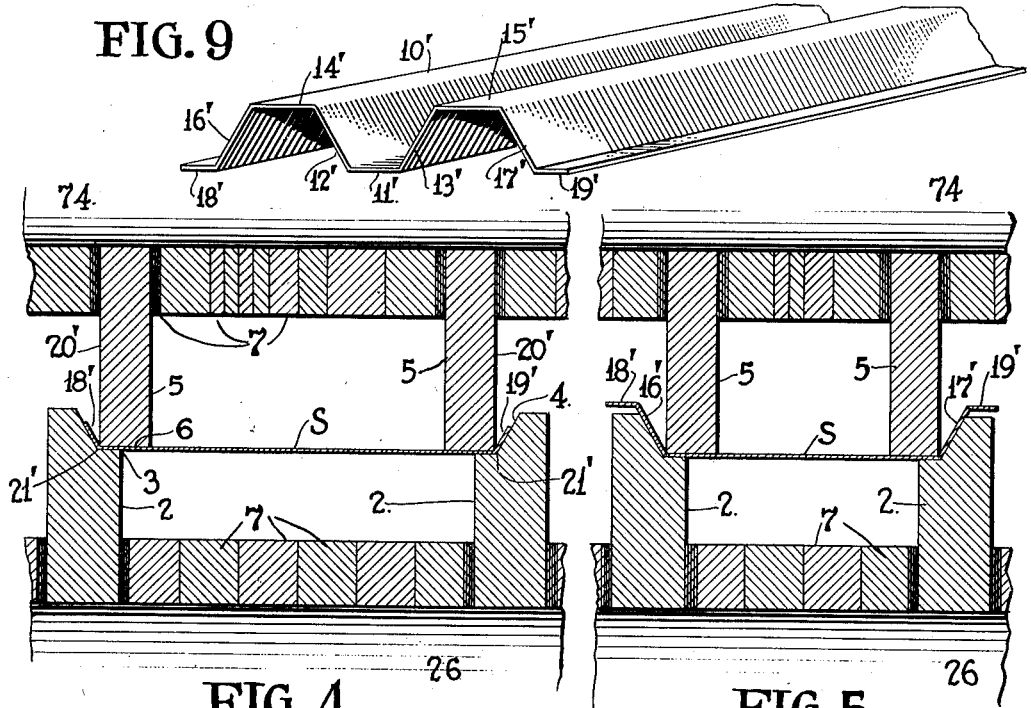
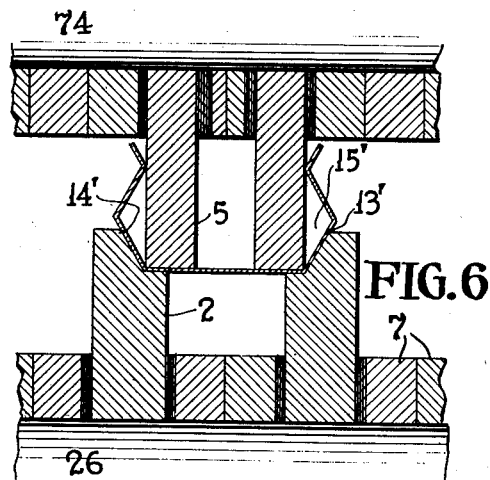
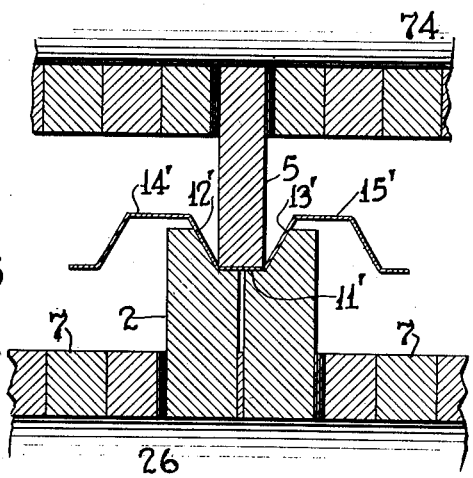
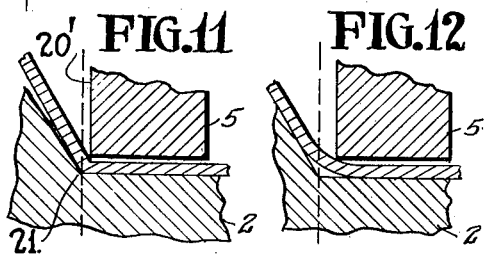
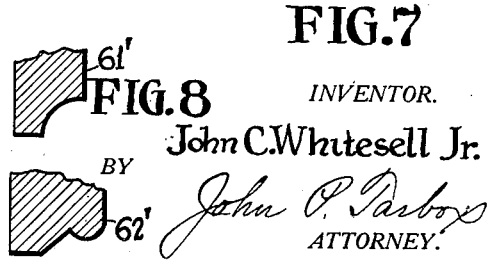
INVENTOR.
John C. Whitesell Jr.
BY
ATTORNEY.

Patented Aug. 14, 1934

1,970,347

UNITED STATES PATENT OFFICE 1,970,347

METHOD AND APPARATUS FOR SHAPING SHEET MATERIAL

John C. Whitesell, Jr., Philadelphia, Pa., assignor to Edward G. Budd Manufacturing Company, Philadelphia, Pa., a corporation of Pennsylvania Application June 9, 1930, Serial No. 459,979

11 Claims. (Cl. 153—28)

This invention relates to an apparatus for cutting and shaping sheet material, and has to do more particularly with draw rolling machines and cutting machines for forming and cutting metal strips of regular or irregular formation, as for example: for forming the chord members of a truss section in an airplane or the like.

The principal object of the present invention is to provide a machine for drawing sheet material to a desired shape in which the draw roller or roller die elements are adjustable and replaceable in such a manner that a number of these elements may be operatively positioned in the machine adjacent each other to form, in effect, a unitary draw roller of such irregular configuration as to act upon the sheet material being drawn through the machine to shape the same to the desired structural form.

A still further object of the invention is to provide an apparatus for shaping sheet material in which a relatively small number of roller die elements may, by interpositioning and proper spacing of these elements, be employed to perform various operations upon the material to be shaped, thereby eliminating the necessity of providing special roller dies for each operation.

An additional object of the invention is to provide a machine which may be employed either as a draw roller machine for shaping sheet material or as a cutting or shearing machine, as desired.

Yet another object of the invention is to provide a draw roller machine in which the wear upon the roller and distortion of the sheet material due to friction is substantially negligible, and one in which economy in operation is a resultant characteristic.

Other objects of the invention not at this time more particularly enumerated, will become more readily apparent as the nature of the invention is better understood, and the same consists in the novel construction, combination and arrangement of parts shown in the accompanying two sheets of drawings in which, Fig. 1 is a sectional view taken transversely through the machine, showing the same assembled for operation.

Figs. 4, 5, 6 and 7 are fragmentary sectional views taken through the roller die assembly proper, showing the method whereby a sheet of metal may, by successive operation in the same machine be shaped to a desired form.

Fig. 8 is a fragmentary view of a number of different forms of roller dies that may be employed in the machine assembly.

Fig. 9 is a perspective view showing a finished strip as manufactured in accordance with the present invention, such strip for the purpose of illustration, representing a chord section in a truss member on an airplane.

Figs. 11 and 12 are diagrammatic views illustrating the effect of various adjustments in the spacing of the die rollers upon the finished product.

Figure 1:
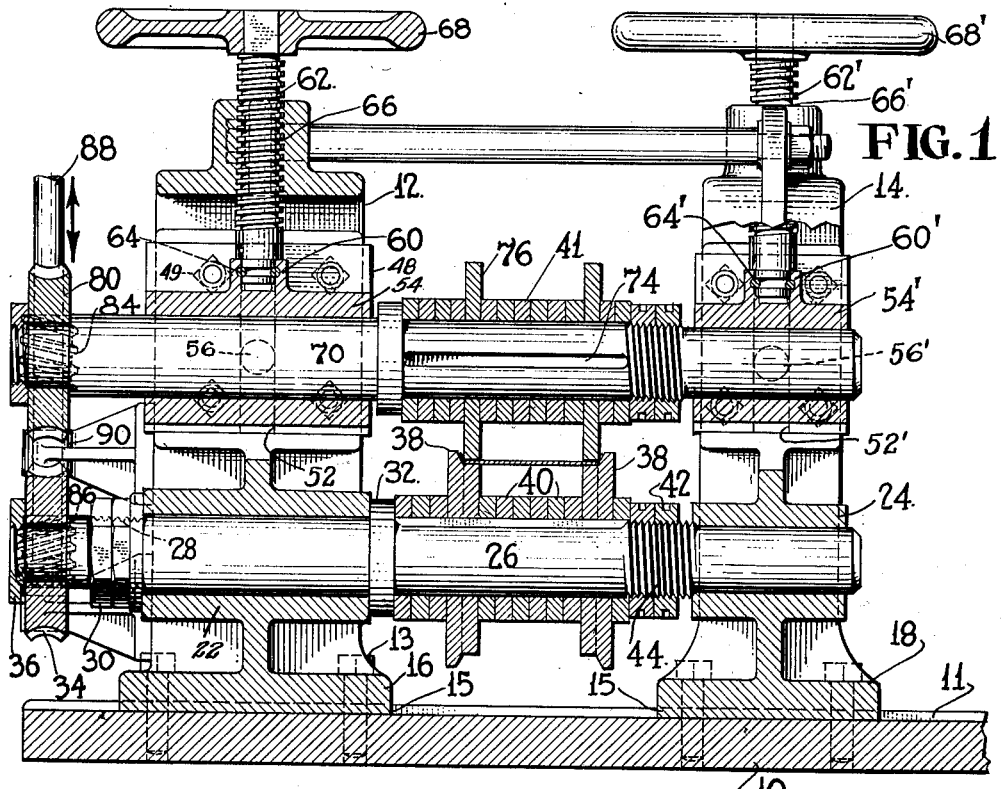

In all of the above-mentioned views, like characters of reference are employed to designate like parts throughout. The device involves in its general organization, a base 10 having thereon a longitudinally transverse slot 11. Mounted upon this base 10 are a pair of standards 12 and 14, which standards are provided with base portions 16 and 18, having on their underneath surfaces transverse keys 15, loosely receivable in the slot 11, whereby the standards, together with the elements of the machine supported thereby, are separately slidable transversely upon the base 10. In order to prevent movement of the standards when the machine is in assembled operative condition a plurality of cap screws 13 extend through the bases 16 and 18 of the standards 12 and 14 and into holes in the base 10. These cap screws are readily removable to permit sliding movement of the standards for a removal purpose of working tools more fully outlined hereinafter.

Each of the standards 12 and 14 are in the form of integral castings having sides 91 connected by vertical webs 92 and a horizontal web 20. Each of the units 12 and 14 is provided with a fixed bearing, which bearings are designated at 22 and 24 respectively and are supported by the webs 92 and 20. The standards 12 and 14 are spaced from each other and their respective bearings 22 and 24 serve to journal therebetween a lower spindle or roller shaft 26. The shaft 26 extends completely through each bearing and is provided exteriorly of the bearing 22 with a threaded portion 28 adapted to receive thereon a pair of clamping nuts 30. The shaft 26 is provided medially of its ends with a collar 32, and this collar, together with lock nuts 30 on the threaded portion 28, serves to retain the shaft 26 in operative position.

The shaft 26 is extended outwardly of the threaded portion 28 and has mounted thereon a worm gear 34 secured in position by a nut 36. The central portion of the shaft 26 is adapted to carry a plurality of movable roller dies 38 and spacing members 40, which members are clamped in position against the flange or collar 32 by means of clamping nuts 42 receivable on a threaded portion 44 of the shaft 26.

The inner sides of the standard 12 are provided with a pair of flat opposed faces 93 and 94, and secured to these faces by means of cap screws 46 are a pair of blocks 48 and 50, respectively. Each of these blocks is provided with a channel 52 therein. A bearing member is shown at 54 and this bearing member is provided with a pair of lugs 56 on opposite sides thereof, which lugs extend into the channels 52 and thus the bearing member 54 is mounted for vertical sliding adjustment between the side members of the frame while also having a permissible rocking movement to the extent that the lugs 56 do not prevent the bearing member 54 from tilting. Thus the bearing block 54 accommodates itself to the position of the shaft 70. Similarly, in the instance of the standard 14 the same arrangement of parts for the upper bearing assembly is shown and the same reference numerals with the prime suffix have been applied to the opposed faces, the blocks and their cap screws, the channels in the blocks, the lug on the bearing member, and the bearing member itself.

The bearing members 54 and 54' are provided with sockets 60 and 60' in which are rotatably receivable the respective ends of a pair of threaded shanks 62 and 62'. The ends of these shanks are provided with annular recesses cooperating with annular recesses in the sockets 60 and 60' to retain, respectively, a pair of locking rings 64 and 64' by which swivelled connections between the shank 62 and the bearing member 54 and between the shank 62' and the bearing member 54' is made. The threaded shanks 62 and 62' are receivable in threaded bores 66 and 66' respectively formed in the upper portions of the standards and suitable hand wheels 68 and 68' are mounted on the ends of the threaded shanks 62 and 62', respectively, so that the bearing members 54 and 54' may be independently raised or lowered as desired. The bearing members 54 and 54' serve to support therebetween a shaft 70 similar to the shaft 26. The shaft 70 is provided with a key and slot arrangement 74 intermediate its ends for the purpose of securing thereto a plurality of upper roller die members 76, similar to the members 38 and spacer elements 41 therefor. The upper roller die elements 76 are adapted to cooperate with the roller die elements 38 in shaping the material to be formed in a manner to be more fully outlined hereinafter.

The outer end of the shaft 70 has mounted thereon worm gear 80. This gear, together with the gear 34 on the shaft 26 is adapted to be engaged by respective worms 84 and 86 formed on the shaft 88. The worm 84 is of a reverse pitch from the worm 86 so that the shafts 70 and 26, when operating as driven elements, will rotate in opposite directions. The shaft 88 is slidable in a bearing 90, a sufficient extent to permit disengagement of the worms 84 and 86 from the worm gears 80 and 34, respectively, without their removal from the shaft, when the machine is to be used for a shaping operation rather than a cutting operation.

Referring now to Figs. 4, 5, 6, 7, 8, 9 and 11 and 12, for the purpose of illustration, the method of forming a polygonal truss section is shown. For convenience and to avoid confusion with the preceding description of the die shaping mechanism, different characters of reference from those assigned to similar parts in Fig. 1, will now be employed in connection with these latter figures.

The finished truss section shown at Fig. 9 is provided with a central portion 11', divergent side portions 12' and 13', aligned top portions 14' and 15', outwardly inclined portions 16' and 17', and aligned outer flanges 18' and 19'. In the manufacture of such a truss section the outer flanges 18' and 19' may be formed by setting up the roller die elements together with the spacing elements in a manner similar to that shown in Fig. 4 so that a sheet of material S interposed between upper and lower die rollers may be bent to form these flanges 18' and 19'. To this end a pair of lower die rollers 2 are provided. These rollers each have a lateral annular shoulder 3 and an inclined annular shoulder 4, the angle between the shoulders 3 and 4 being determined by an additive and subtractive calculation determined by the ultimate alignment of the flanges 18' and 19' and the intermediate shaping process carried out prior to completion of the finished article. A pair of upper die rollers are each shown at 5 and these rollers are preferably formed with single annular surfaces 6 adapted to cooperate with the surfaces 3 on the lower die rollers to maintain the portions of the sheet material between these surfaces in alignment, while permitting the flanges 18' and 19' to be bent upwardly to conform to the inclined shoulders 4 on the lower die rollers. The lower die rollers 2 are spaced apart a predetermined distance by means of a plurality of spacing rings 7 while the upper die rollers are similarly spaced apart the proper distance to bring the surfaces 3 and 6 into opposed relation, whereby the sheet material may accurately be shaped.

While the distance between the outer faces 20' of the upper die rollers 5 may be substantially equal to the distance between the outer edges 21' of the shoulders 3, means is contemplated for adjusting the distance between the outer faces 20' of either the rollers 5 or the rollers 2 so that this distance may be slightly less than the distance between the outer edges of the shoulders 3. This means for adjusting the spacing of the die rollers will be more fully described hereinafter.

Referring now to Fig. 5, it will be seen that the upper die rollers 5 and the lower die rollers 2 have by removal of certain of the spacing blocks, been re-adjusted to a predetermined setting for forming the inclined surfaces 16' and 17' on the truss section. The sheet material S is shown as having been placed reversely between the upper and lower die rollers and drawn into the cross sectional shape shown in this figure. It will be seen that by such a process of drawing, the flanges 18' and 19' have been thrown into alignment while the surfaces 16' and 17' have been formed.

In Fig. 6 a third setting of the same upper and lower die rollers is shown. This setting is such that when the sheet of material S, formed as shown in Fig. 5 is drawn, also reversely, through the upper and lower die rollers 5 and 2, the surfaces 14' and 15' are outlined but not as yet properly oriented.

In the last operation shown in Fig. 7, the lower die rollers 2 are again re-adjusted, while a single upper die roller 5 of a sufficient width to perform the desired operation serves in conjunction with the lower die rollers 2 to form the divergent surfaces 12' and 13' and the portion 11'. By this operation the surfaces 14' and 15', already outlined by a previous operation, are properly oriented in alignment and the completed article is shaped. In this operation the work is again reversely placed.

Referring particularly to Figs. 11 and 12, the upper draw roll 5 is shown as being spaced from the lower draw roll substantially a distance equal to the thickness of the sheet material and the edge 20' is spaced slightly inwardly from a vertical plane passing through the intersection of the angular faces of the lower draw roll 2 so that the sheet material being drawn will merge from the roller dies with a comparatively sharp bend. In Fig. 12, the upper roller die 5 is spaced from the lower roller die a distance slightly greater than that shown in Fig. 11 and this upper roller die is also spaced inwardly of the vertical plane through the intersection of the faces on the lower roller die a distance slightly greater than in the preceding figure. In both instances, the roller dies are laterally and vertically spaced by a small but sufficient distance so that the material being drawn is loosely engaged to prevent unwarranted distortion of the material or frictional slippage of the rolls, upon the material. This vertical adjustment may readily be effected by operation of the hand wheels 68 and 68' shown in Fig. 1.

In order to effect lateral adjustment, the spacing members employed are formed of different sizes. For example, a plurality of spacing elements may be formed of the following thicknesses measured in inches.

| | |
|---|---|
| 1.000 (1) | .375 (3/8) |
| .750 (3/4) | .250 (1/4) |
| .625 (5/8) | .125 (1/8) |
| .500 (1/2) | and shims. |

In addition to the above standard size spacing elements, a number of over-size spacing elements may be formed which, for example, are of the following dimensions.

| | |
|---|---|
| 1.005 (1+) | .380 (3/8+) |
| .755 (3/4+) | .255 (1/4+) |
| .630 (1/2+) | .130 (1/8+) |
| .505 (5/8+) | |

In addition to the above oversize spacing elements, undersize spacing elements may be formed, for example, of the following sizes.

| | |
|---|---|
| .950 (1−) | .370 (3/8−) |
| .700 (3/4−) | .245 (1/4−) |
| .620 (5/8−) | .120 (1/8−) |
| .495 (1/2−) | |

By employing spacing elements for the roller dies of such varying dimensions, it will be seen that the upper and lower die elements may be adjusted to and from each other to a very minute degree by selecting various combinations of spacing elements chosen from the above dimensions furnished the manufacturer, and such adjustability is obtainable with or without the use of shims. Where an adjustment is employed which effects inward displacement with the upper die rollers with respect to the lower die rollers, equal pressure at the sides is imparted to the sheet material for the bending thereof due to the fact that the upper shaft 70 is free to float or move longitudinally of itself, and the centering of the shaft longitudinally is automatically taken care of by the distributed pressure of the sheet material.

Figures 2, 3, 10:
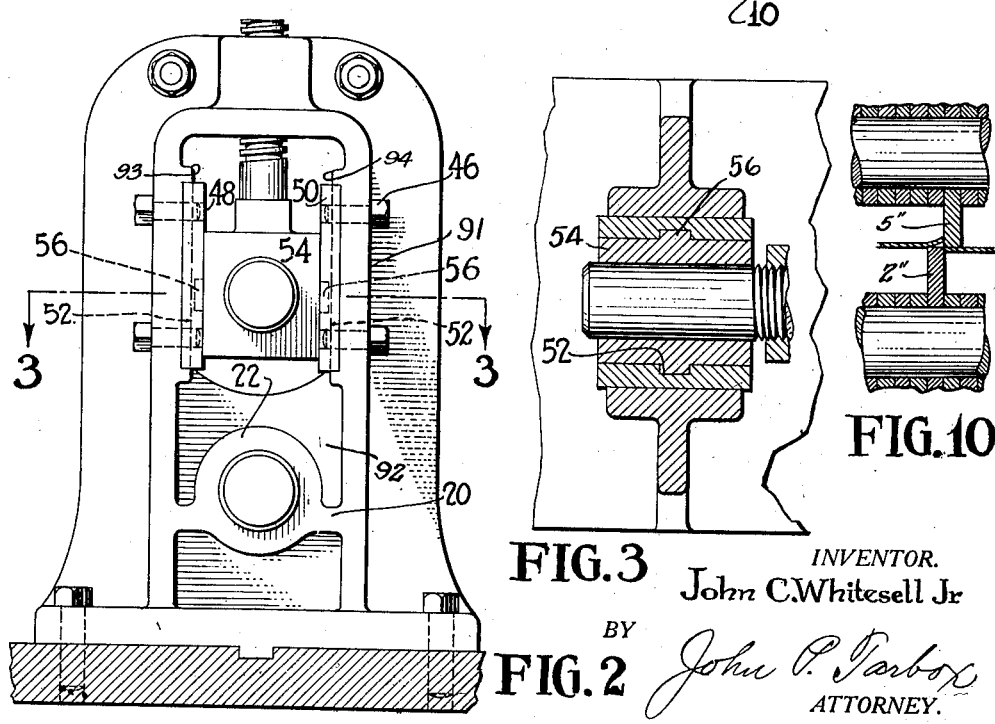
Fig. 2 is a side elevation of the machine.
Fig. 3 is a sectional view taken substantially along the line 3—3 of Fig. 2.
Fig. 10 is a fragmentary sectional view, showing the machine in operation as a power driven roller cutting machine.

It has been found preferable for performing the shaping operations, to draw the material through the rolls. However, where the cutting operation is carried on between the upper and lower rollers 2" and 5" respectively, shown in Fig. 10, the shaft 88, Fig. 1, is thrown into engagement with the shafts 70 and 26 to drive the same in opposite directions, while at the same time forcing the material between the rolls.

Under conditions of quantity production where a great number of identical pieces such as polygonal chord members for truss sections, spars or the like are to be formed, it is contemplated using separate machines, each one adjusted to perform a successive step upon the sheet material, as for example, such steps as are illustrated in Figs. 4 to 7, inclusive. The use of a number of these machines in this manner in series for carrying out the various steps of the process, eliminates the necessity for adjusting each machine a number of times for treating a single sheet of material.

It is to be understood that the invention is not limited to the use of the apparatus shown for forming chord members of a truss section in an airplane, but it is quite obvious that the principles of the invention may be extended to the formation of all manner of sheet metal sections polygonal, or otherwise, whether symmetrical or not. For example, the draw rolls shown in Fig. 8 and designated at 61' and 62' are examples of roller dies that may be employed for forming irregular curved sections.

I do not desire to limit myself to the exact arrangement of parts shown in the accompanying drawings or described in this specification. Only in so far as the invention is particularly pointed out in the accompanying claims is the same to be limited.

What I claim is:

1. In a draw roller machine having a pair of roller shafts one of which has a slight permissible movement endwise with respect to the other, a roller die element cooperatively mounted on each of said shafts to engage a sheet of material therebetween to shape the same, means for adjusting the roller die element on each shaft axially with respect to the shaft, and means for leveling one of said shafts.

2. In a draw roller machine having a pair of roller shafts one of which shafts being fixed against endwise movement and the other of said shafts having a slight permissible movement endwise, a roller die element cooperatively mounted on each of said shafts to engage a sheet of material therebetween to shape the same, means for adjusting the roller die element on each shaft axially, and means for leveling one of said shafts and for adjusting the distance between said shafts.

3. A draw roller machine comprising, in combination, a pair of standards, a fixed bearing in each standard, a shaft journalled in said bearing, a vertically adjustable bearing in each of said standards, a second shaft journalled in said last-mentioned bearings, a plurality of roller die elements cooperatively and detachably mounted on each shaft to engage a sheet of material therebetween, means for driving said shafts in opposite directions, and means for rendering said last-mentioned means inoperative, whereby said shafts may be freely rotatable.

4. In a draw roller machine having a roller shaft, a support for an end of said shaft comprising a standard having opposed faces, a pair of opposed face plates removably secured to said opposed faces, there being a channel in each face plate and a bearing member for said shaft having a lug on each side thereof, said lugs each extending into one of said channels.

5. In a draw roller machine having a roller shaft, a support for an end of said shaft comprising a standard having opposed faces, a pair of opposed face plates removably secured to said opposed faces, there being a channel in each face plate and a bearing member for said shaft having a lug on each side thereof, said lugs each extending into one of said channels, said bearing member having a pair of flat surfaces bearing against said face plates.

6. In a machine of the character described, a pair of standards, a fixed bearing in each standard, a shaft journaled in said bearings, an adjustable bearing in each of the standards, a second shaft journalled in said last-mentioned bearing, and a plurality of rotatable tool elements cooperatively mounted on each shaft between said standards for engaging a sheet of material therebetween.

7. A draw roller machine comprising a base, a pair of standards secured to the base in spaced relation, a bearing in each standard, a roller shaft journaled in said bearings and free to slide axially therein, roller tool elements mounted on the shaft, rigid spacer elements mounted on said shaft between the tool elements, other rigid spacer elements mounted on the shaft between the said bearings and the tool elements to limit the sliding movement of the shaft, and means securing the standards in fixed spaced relation engaging the standards at points above the shaft bearings.

8. The method of forming a polygonal truss section from strip sheet material which comprises bending the strip along each side a given distance from the edge parallel thereto and at a given angle to form a channel or trough, then bending the strip in the opposite direction along each side of the longitudinal center line a further given distance from the adjacent edge parallel thereto and at the same given angle, then bending in the same direction as the last along two lines each a still further given distance from the adjacent edge and at the same given angle, and then bending in the opposite direction along two lines each a further given distance from the edge parallel thereto and at the same given angle.

9. A roller machine for shaping sheet material, comprising a pair of roller shafts, each having removably mounted thereon a number of rollers with rigid spacers therebetween, means on each shaft for fixedly clamping said rollers and spacers in assembly on said shaft, the assemblies on the two shafts being in spaced interfitting relation, one of said shafts having means to hold it in its bearings against axial movement and the other shaft being adapted for a limited amount of free floating axial movement to maintain the said roller assemblies in said spaced interfitting operative relation.

10. A roller machine according to claim 9, in which the shafts are adapted to be driven in opposite directions and to have their driving means rendered inoperative so that the shafts may rotate freely.

11. A roller machine according to claim 9, in which standards for supporting the shaft bearings are provided with opposed face plates removably secured to opposed faces of said standards, each face plate being provided with a socket for the reception of a lug arranged on the bearing of the adjustable shaft.

JOHN C. WHITESELL, Jr.